ated Aug. 13, 1974

3,829,400
FLAME RETARDANT POLYAMIDE FIBER COMPOSITION USING OXY-TIN COMPOUNDS AND PROCESS FOR THE PREPARATION THEREOF
Tetsuya Kato, Nagoya, and Tutomu Ohira, Ogaki, Japan, assignors to Toray Industries, Inc., Tokyo, Japan
No Drawing. Filed May 26, 1972, Ser. No. 257,425
Claims priority, application Japan, May 28, 1971, 46/36,303; July 16, 1971, 46/52,447
Int. Cl. C08g 51/04, 51/56
U.S. Cl. 260—37 N         16 Claims

ABSTRACT OF THE DISCLOSURE

The present invention describes a flame retardant polyamide fiber and a process for production thereof which includes the concurrent use of an oxy-tin compound and a halogen as flame retardant agents. The halogen may be a halogen contained in either a divalent metal halide or an organic halogen compound.

Furthermore, when a zinc compound, for example, zinc oxide or zinc hydroxide is added to the polyamide in addition to the oxy-tin compound and halogen, the flame retardant effect increases substantially.

BACKGROUND OF THE INVENTION

Field of the Invention

The present invention relates to polyamide fiber having excellent flame retardant qualities and a process for the preparation thereof. More particularly, the present invention provides a polyamide fiber having very high flame retardancy considering the amount of a flame retardant agent blended therewith, and which generates small amounts of poisonous gas at the time of combustion. At present, various polyamide fibers having excellent tenacity, dyeability and abrasion resistance are broadly used as textiles, including clothing and industrial uses. However, polyamide compounds being organic compounds are essentially flammable, acting as an igniting agent or fuel at the time of a fire, tending to increase the danger of incendiary damage.

DESCRIPTION OF THE PRIOR ART

Heretofore, many attempts have been made with reference to making polyamide fiber flame retardant. For example, a method of mixing an organic bromine compound such as hexabromobenzene with polyamide at the time of melting or imparting said compound to polyamide by after-processing after polyamide has been shaped, has been known. However, in these conventional methods, the flame retardant agent decomposes and sublimes when the polyamide burns, causing a major part of said fire retardant agent to evaporate and dissipate before developing the desired flame retardant characteristics. The efficiency of such prior art attempts is poor and it has not been possible to obtain high flame retardance in any event. Furthermore, because it has heretofore been necessary to blend a large amount of the flame retardant agent to achieve any fire retardant characteristics there have been concomitant disadvantages such as decreased shapeability or bleeding out of the fire retardant in use. As for the method of after-processing, the washing fastness has been extremely poor, and there has also been the problem of the resultant fiber losing a greater part of the fire retardant at the time of the first washing. In addition, while it is true that polyamide fiber blended with flame retardant agents in accordance with the prior art is unlikely to be ignited in the presence of fire, yet even if it is ignited it has self-fire extinguishing properties under some conditions. However, such a modified polyamide has very great disadvantages in that when it burns while being exposed to high temperatures, it burns faster than unmodified polyamide and generates a large amount of a poisonous halogen gas.

In order to improve these drawbacks, a method of concurrently using both zinc oxide and antimony trioxide as well as an organic halogen compound has been proposed, however, a satisfactory effect has still not been obtained.

In the specification of U.S. Pat. 3,468,843, it is described that flame retardance may be imparted to nylon 6,6 by the concurrent use of a metal halide such as zinc bromide with a metal such as tin. However, in this case, a metal such as tin per se has no spinability and cannot be pulverized, therefore, it is difficult to directly introduce such a metal into the fiber and it is therefore not possible to apply this technology to fiber. Also, in the case of metallic tin being introduced, polyamide becomes black. Moreover, this technology is not effective with respect to a polyamide such as nylon 6.

SUMMARY OF THE INVENTION

An object of the present invention is to provide flame retardant polyamide fiber which will not generate substantial poisonous gas at the time of combusion, which proceeds to carbonize rather than flame during combustion, tending to extinguish fire by itself, and which exhibits high flame retardancy with a relatively small amount of flame retardant agents blended therewith, and a process for the preparation of such polyamide. In addition, the present invention aims at providing such a fire retardant polyamide whose shapability upon forming fiber is good, and which has good washing fastness.

The present inventors found that a tin compound, especially an oxy-tin compound, accelerates gelation of polyamides, and has the effect of inhibiting the generation of flammable gas decomposition product of the polymer when polyamide burns. Yet when these oxy-tin compounds are blended with polyamide fiber by themselves, they fail to have a flame retardant effect at all. However, by concurrently blending a halogen therewith, they exhibit very excellent flame retardant effects, including self-fire extinguishing properties.

DESCRIPTION OF THE PREFERRED EMBODIMENTS

In the present invention, as a tin compound, an oxy-tin compound which does not produce coloration and other undesirable modification of polyamide upon blending is used. For example, stannic hydroxide and a divalent metal salt of stannic acid such as magnesium stannate ($MgSnO_3$), calcium stannate ($CaSnO_3$) and zinc ($ZnSnO_3$) may be used. Each of these oxy-tin compounds will not bring about degradation or coloring of polyamide at the time of melt spinning the polyamide. However, stannous or stannic halides such as stannous bromide and stannic chloride by themselves are not preferable because when melt blended with polyamide they will normally color and degrade said polyamide and their flame retardancy is poor. Such a stannous or stannic halide may be converted to a hydroxide by reacting with water (hydrolysis) and used effectively. These oxy-tin compounds are introduced into the polyamide before or after melt spinning. For example, in case of a divalent metal salt of stannic acid, it may be blended with polyamide by adding to polyamide at the time of polymerization or mixed with polyamide pellets at the time of melt spinning. Also it is possible to introduce a divalent metal salt of stannic acid with the fiber after the polyamide is made into fiber, by treating the fiber with a solution of an α-alkali metal stannate such as, for example, α-sodium stannate ($Na_2SnO_3$) and α-potassium stannate ($K_2SnO_3$)

and absorbing said α-alkali metal stannate in the fiber, by substituting said α-alkali metal stannate to a divalent metal salt with aqueous divalent metal (zinc, calcium and magnesium) salt solution. As a solvent of α-alkali metal stannate and divalent metal salt, water is preferable. The concentration of α-alkali metal stannate and divalent metal salt solution varies depending upon the required absorbed amount, however, a concentration in the range of from about 1% by weight to 50% by weight is preferable. The treating temperature with α-alkali metal stannate and divalent metal salt solution is within the range of from about 20° C. to 100° C.

As divalent metal (zinc, magnesium and calcium) salts, divalent metal halide, sulfate, nitrate, such as zinc chloride, zinc nitrate, zinc sulfate, magnesium chloride, magnesium nitrate, magnesium sulfate, calcium chloride and calcium nitrate are preferable. Stannic hydroxide may be introduced into said polyamide pellets or fibre by subjecting the pellets or fiber, after they are formed, with a solution of a halogenated tin compound, namely, stannous or stannic halide such as stannous chloride, stannic chloride, stannous bromide, stannic bromide, stannous halogenated stannate such as potassium hexachlorostannate ($K_2SnCl_6$), ammonium hexachlorostannate $$[(NH_4)_2SnCl_6],$$

ammonium hexabromostannate [$(NH_4)_2SnBr_6$] and sodium hexabromostannate ($Na_2SnBr_6$) and mixture thereof and absorbing the halogenated tin compound in said polyamide pellets or fiber by reacting said compound with water and converting said compound to stannic hydroxide (hydrolysis).

As solvents for these desirable halogenated tin compounds, any solvent may be used insofar as it may dissolve these metal salts. Water is most preferable, however, although non-aqueous solvents such as alcohols and ketones will do as well. The concentration of the treating solution varies depending upon the required absorbed amount and the solvent used, however, normally a concentration in the range of from about 0.5 mol/liter to 2.0 mol/liter is preferable. In the case of a non-aqueous solvent, a lower concentration is preferable from the viewpoint of preventing damage to the polyamide. In case of using an aqueous solution, care must be taken so that substantial hydrolysis of halogenated tin compounds in the solution may not occur. The treating temperature may be whatever temperature will be effective as long as it is below the boiling point of the solvent, however, the treatment at a high temperature under pressure will also suffice. Particularly, the temperature in the range from 20° C. to 100° C. is preferable.

Care must be used to ensure that the treating solution does not have too high a concentration of flame retardant agent, for when polyamide is treated with such solution at a high temperature, the polyamide is damaged. The treating period may be decided entirely dependent upon the required adsorbed amount of tin compounds.

An important point upon introducing stannic hydroxide into polyamide by the method of this invention is reacting with water (hydrolysis) the aforesaid halogenated tin compound absorbed in polyamide. The reaction with water for converting the halogenated tin compound as such may be practiced by a method of washing with water or an aqueous solution of alkali such as sodium carbonate or sodium hydroxide, or contacting such polyamide with heated water vapor. The preferable treating temperature is in the range of from 20° C. to 100° C.

While the appropriate amount of the oxy-tin compound to be blended with polyamide varies depending upon the degree of flame retardance required, however, blending of the oxy-tin compound in an amount of 1.0–15% by weight calculated as tin based on polyamide is preferred. In case the blending amount of the oxy-tin compound fails to reach 1.0% by weight calculated as tin, the action of the oxy-tin compound in accelerating the gelation of polyamide and forming carbonized film when the polyamide burns is slight and high flame retardancy is not obtained. On the other hand, in the case where the blending amount of the oxy-tin compound exceeds 15% by weight calculated as tin, the polyamide is substantially degraded.

In accordance with the composition and method of the present invention, by the application of both an oxy-tin compound and a halogen, it is possible to obtain excellent flame retardancy having self-fire extinguishing properties. This halogen may be an inorganic halogen, for example, a halogen in a metal halide, or an organic halogen.

In case a halogenated tin compound is used as a method of introducing the oxy-tin compound, a part of halogen may be made to remain chemically bound in the fiber by adjusting the reaction conditions with water.

To provide halogen, preferably a divalent metal halide, for example, zinc chloride, zinc bromide, magnesium chloride, magnesium bromide, calcium chloride or calcium bromide is blended, or else an organic halogen compound is blended separately.

Each of the aforesaid divalent metal halides has high affinity for the polyamide and the property of coordination bonding to the amide group of polyamide when it is added to polyamide. Such characteristics are very important upon introducing an inorganic salt into polyamide. A metal halide having low affinity with polyamide, for example, sodium chloride and potassium bromide cannot be adsorbed and introduced into polyamide by immersing polyamide in a solution of such halide. Even if a halogen is so introduced, it is easily removed by washing or cleaning. In the case where an inorganic salt not having affinity for polyamide is melt blended with polyamide, it cannot dissolve in polyamide and such salt obstructs the spinnability of polyamide and the polyamide cannot be well spun due to yarn breakage and the like.

As to the manner of introducing the aforesaid divalent metal halide into polyamide fiber, it may be added to the polyamide at the time of polymerization, or it may be melt blended with polyamide pellets at the time of melt spinning, or it may be adsorbed introduced into polyamide by immersing polyamide pellets or fabric in a solution of said metal halide prepared by dissolving said halide in a solvent such as water, alcohol and ketone. The concentration of the metal halide solution is generally 0.5–2.0 mol/liter and the absorbing temperature may be freely established with the absorbing period corresponding to the required adsorbed amount, as long as such temperature is below the boiling point of the solvent.

As said organic halogen compound, for example, both a halogenated paraffin and a nuclear halogenated aromatic compound may be used, however, a nuclear halogenated aromatic compound is preferred.

Namely, these nuclear halogenated aromatic compounds are generally more stable to heat than the halogenated paraffin and alicyclic series, having little tendency to decompose, to contribute undesirable coloration to the polyamide or to degrade the polyamide when they are blended therewith and the blend is melt shaped. Further, these nuclear halogenated aromatic compounds decompose at the time of combustion and generate halogen gases, which react immediately with oxy-tin compound as will be mentioned later, thereby accelerating the gelation and carbonization of polyamide.

As these organic halogen compounds, for example, the following compounds may be cited.

A nuclear halogenated benzene derivative such as tribromobenzene, hexachlorobenzene, hexabromobenzene, pentachlorotoluene and pentabromotoluene;

A nuclear halogenated aniline and its derivatives such as tribromoaniline,
2,4,6-tribromoacetanilide,
N-(2,4,6-tribromophenyl)benzamide,
3,5-dibromo-N-(2,4,6-trichlorophenyl) benzamide,
4-bromo-N-(2,4,6-tribromophenyl) benzamide, bis(2,4,6-tribromotribromophenyl) succinoamide,
bis(2,4,6-tribromophenyl)-2-bromoisophthalamide, and
bis(2,4,6-trichlorophenyl) terephthalamide;

A halogenated biphenyl such as pentabromobiphenyl, hexachlorobiphenyl and hexabromobiphenyl;

A halogenated diphenylether such as hexabromodiphenylether and pentabromodiphenylether;

A halogenated diphenylamine such as tetrabromodiphenylamine and hexachlorodiphenylamine;

A halogenated naphthalene and derivatives thereof such as pentabromonaphthalene and hexachloronaphthalene; and A halogenated diphenylsulfone such as hexabromodiphenylsulfone and bis(2,6 - dibromo - 4-aminophenyl) sulfone.

These halogen compounds may be used alone or in admixture of at least two different kinds, however, a compound is not limited to what is mentioned above as long as it does not color or degrade polyamide. The kind of halogen atom is not limited particularly, however, chlorine and bromine are generally preferred. Bromine has a remarkable flame retardant effect and is most preferable.

The amount of the halogen compound to be blended with the polyamide is decided according to the degree of flame retardancy required and is generally determined in accordance with the halogen content in the compound as well as the kind and amount of the oxy-tin compound used concurrently with said compound, but blending of the halogen compound in an amount of from about 1.0–20% by weight calculated as halogen based on polyamide is desirable. In the case where the amount of halogen is less than 1.0% by weight, regardless of the amount of the oxy-tin compound to be used concurrently therewith, flame retardancy cannot be achieved. On the other hand, in the case where the halogen compound is blended in an amount of more than 20% by weight calculated as halogen, the degradation of polyamide becomes likely and the good properties of the fiber such as tenacity or spinnability are lost.

By means of the process and composition of the present invention, it is possible to obtain polyamide fiber having high flame retardancy by concurrently using an oxy-tin compound and halogen. Additionally, however, in the case where a zinc compound is further used concurrently, even higher flame retardancy is obtained. When polyamide burns, these zinc compounds react with the halogen compound, and the active compound obtained as a result promotes foaming and carbonization of the polyamide, with the result that the film of carbon generated covers the polymer to thereby shut out heat, having an action of promoting self-fire extinguishing.

As zinc compounds used in the present invention, any zinc compound may be used insofar as it will not cause discoloration and degradation of the polyamide when blended therewith and is capable of reacting with the halogen compound when the polyamide burns. They are, for example, zinc oxide, zinc carbonate and zinc hydroxide.

The amount of the zinc compound to be blended with polyamide in accordance with the composition and process of this invention is decided in accordance with the degree of flame retardancy required, by taking into account the chemical nature and amounts of the halogen compound and the oxy-tin compound used concurrently, however, blending of the zinc compound in an amount of from about 1.0–15% by weight calculated as zinc based on polyamide is desirable. In the case where the amount of the zinc compound calculated as zinc fails to reach 1.0% by weight, formation of the objective carbonized film is slight and high level flame retardancy cannot be achieved. On the other hand, blending of the zinc compound in an amount exceeding 15% by weight calculated as zinc based on polyamide makes the polyamide have a dull luster, hurting its appearance, and at the same time greatly deteriorating the mechanical properties, thereby resulting in loss of the utility.

Attention should be paid especially to the molar ratio of the zinc compound to the halogen compound and an excess of either one is not preferable from the viewpoint of the degree of flame retardancy achieved and deterioration of the polymer properties in concomitance with blending of a flame retardant agent. It is especially meaningless to add an excess amount of the zinc compound. From experimental results, the molar ratio of zinc (Zn) to halogen (X) in polyamide (Zn/X) of from 1:1 to 1:3 is preferred.

It is desirable to add these zinc compounds to polyamide at the time of polymerization, or to mix these compounds with polyamide pellets at the time of melt spinning.

Polyamides effective as flame retardant polyamide fibers in accordance with the compositions and process of the present invention are polyamides obtained by condensation polymerization of at least a 3-member ring lactam, a polymerizable ω-amino acid, or a salt of a dibasic acid and a diamine. Most generally, they are poly-ε-caprolactam (nylon 6), polyhexamethylene adipamide (nylon 66) and copolymers thereof.

These polyamides may contain a third component such as known pigments, dyestuffs, heat resistant agents and light resistant agents.

The polyamide pellets in the present invention may be in the forms of small cylinder, rectangular solid, cube, crashed chip and so on having their volume within the range of 1–1000 cubic millimeter.

The method of preparing the polyamide pellets may use a conventional method. For example, the molten polyamide in a polymerization apparatus such as autoclave after finishing the polycondensation is extruded into water (0–40° C.) and the solidified polyamide is cut to pellets by a cutting machine.

The flame retardant agents of this invention may add in polyamide in the polymerization process. And, it is also to prepare modified polyamide pellets by blending the unmodified polyamide pellets and the flame retardant agents, melt-blending by an extruder, extruding into water and cutting by a cutting machine.

The method of preparing the polyamide fiber may use a conventional method. For example, the polyamide pellets are melt spun using the conventional spinning machine such as extruder or pressure melter type spinning machine at the temperature within the range of from the melting temperature of the polyamide to the decomposition temperature of the polyamide, preferably from about 250° C. to 300° C., wound up at speed in the range of from 100 to 2000 m./min., and then drawn few times (from 2 to 7 times) the original length.

The flame retardant polyamide fiber of the present invention can be prepared by introducing the oxy-tin compounds and the halogen compounds, and if higher flame retardancy is required, zinc compounds are added concurrently.

These flame retardant agents may be added into polyamide by various method at any stage of the process of the fiber production. But as mentioned before, preferable methods of addition exist as follows. The stannic hydroxide as oxy-tin compound is introduced into polyamide by absorbing a halogenated tin compound in the polyamide pellets, fiber and fiber products and reacting the absorbed polyamide with water, to thereby convert to stannic hydroxide after pelletizing of the polyamide, or before or after finishing and dyeing the polyamide fiber and fiber products.

The divalent metal salt of stannic acid ($ZnSnO_3$, $MgSnO_3$, $CaSnO_3$) as oxy-tin compound is introduced to polyamide by adding to polyamide at the time of polymerization or melt spinning of the polyamide, or by absorbing a α-alkali metal stannate in the polyamide and substituting said α-alkali metal stannate to a divalent metal salt with aqueous divalent metal (zinc, magnesium and calcium) solution before or after finishing and dyeing the polyamide fiber or fiber products.

The flame retardant halogen compound is introduced to polyamide by adding to polyamide at the time of melt spinning the polyamide fiber or absorbing to the polyamide after finishing or dyeing the polyamide fiber and fiber products.

The zinc compound is introduced to polyamide by adding to polyamide at the time of polymerization or melt spinning the polyamide.

As to the sequence of adding the oxy-tin compound, the halogen compound and the zinc compound, any sequence will be effective and they may be repeatedly added insofar as the required blended amounts are obtained. But is is preferable that after introducing the oxy-tin compound and zinc compound, the flame retardant halogen compound is introduced to the polyamide because the oxy-tin compound and zinc compound have high chemical stability to heat and water and do not change during the fiber and fiber products making. For example, a method of blending tin hydroxide with polyamide pellets, melt spinning the pellets and thereafter treating the spun polyamide with a divalent metal halide is a very excellent method capable of effecting good spinning even when large amounts of the fire retardant compounds are blended, and thereby bringing about a high flame retardant effect.

The polyamide fiber of the present invention may be in the forms of multifilament yarn, monofilament yarn, staple fiber, cut pile, tow and a fiber product obtained therefrom such as, for instance, woven fabric, non-woven fabric, carpet and moquette.

The flame retardant polyamide fiber of the present invention has the following characteristics as compared with flame retardant polyamide blended with the prior art flame retardant agents of the organic halogen series.

(1) Firstly, with the blended amount of a flame retardant agent of the same degree, it exhibits very high flame retardance, having very high efficiency.

(2) Secondly, it extinguishes fire by itself when it burns, having the effect of protecting the inside of the fiber products.

(3) Thirdly, very little poisonous gas such as halogen or hydrogen halide is generated.

(4) Fourthly, since high flame retardancy is obtained by blending only a small relative amount of flame retardant agent, when shaping of the polyamide occurs, the effect on spinnability is little.

(5) Fifthly, because all the flame retardant agents may be blended in the polyamide intimately, the washing fastness of fibers is good.

The test methods of flame retardance used in the present invention are as follows.

(1) Oxygen Index, by marginal oxygen concentration method.—From below a glass cylinder having a diameter of 75 mm., a mixed oxygen-nitrogen gas having a predetermined concentration of oxygen is supplied at a flow speed of 5 cm./sec., a sample is introduced into that atmosphere. The upper end of the sample is contacted with a source of ignition (e.g. an illuminating gas flame). The time and distance of combustion are measured while varying the oxygen concentration, and the lowest oxygen concentration at which the sample burns for 3 minutes or 5 cm. is named the oxygen index (abbreviated as O.I.).

Although varying slightly by the shape of the sample, a test result in which the O.I. is not less than 21 means that combustion is extinguished in air, and a test result in which O.I. is below 21 indicates that the fire spreads uncontrolled in air.

Each sample to be measured is prepared in the shape of a cylinder having a length of about 100 mm. and a diameter of about 10 mm. In order to prevent dripping of the molten polymer at the time of combustion, about 10% by weight of glass fiber is mixed with the sample fiber and the outer surface of the cylindrical sample is covered by a Nichrome wire coil (diameter of the coil: 10 mm., pitch: several mm.). When filament yarn is used as a sample, tubular knitted fabric is prepared using a circular knitting machine and this fabric is measured.

(2) Heating-combustion method.—About 0.5 g. ($W_1$) of a sample carefully measured in advance is put in a pan made of aluminum foil having a diameter of 3 cm. and a depth of 1 cm., and the pan is heated in air (450–500° C.) from below by a heat element. The sample is melted for a predetermined time and the upper part of the molten sample is contacted with a flame of a gas burner to cause ignition. The time ($t$) until visible combustion ceases and the weight ($W_2$) of the remaining sample are measured.

At the same time, a glass plate is put over the burning sample and from the amount of soot adhering to said plate, the grade of smoke emission is estimated: largest amount of smoke is grade 1, smallest amount of smoke is grade 4.

The combustion speed ($v$) and the carbon residue (R) are given by the following equations:

Combustion speed:

$$v = \frac{W_1 - W_2}{t} \text{ (mg./sec.)}$$

Carbon residue:

$$R = \frac{W_1 - W_2}{W_1} \times 100 \text{ (percent)}$$

(3) Inclined camphor method (for testing combustibility of carpet).—A 230 mm. long x 100 mm. carpet sample is held with its pile surface facing up while being inclined 45° in a lengthwise direction. A 12 mm. x 12 mm. x 5 mm. square of solid camphor is placed at a position 30 mm. away from the lower end of the carpet. This camphor is ignited and combustion is allowed to continue until the camphor and the sample carpet are consumed or the fire goes out of its own accord. This combustion is conducted in a combustion box according to ASTM JIS-Z-2150 and the combustion time, combustion length, combustion width and combustion area are measured.

Determination of tin (Sn), halogen and zinc (Zn) is carried out by the following methods:

Determination of tin (Sn).—A sample is put in a decomposition flask, to which concentrated sulfuric acid is added, and the mixture is heated to be oxidation decomposed. Thereafter, phenyl fluorene is added to the decomposed mixture to bring out color, and the absorbancy of the developed color at a wave length of 520 m$\mu$ is measured to provide the determination. From the predetermined relation of tin concentration and the absorbancy at 520 m$\mu$ of the solution, tin content is measured.

Determination of halogen.—A sample is put on a platinum boat, heated inside a quartz tube in an oxygen stream to 800° C. to decomposition, and the halogen gas generated is passed into 8% hydrogen peroxide containing 1% of caustic soda and caught and collected as halide ion. This halide ion is measured by a precipitation titration with 0.1 N silver nitrate to determine halogen. Because electric potentials at the equivalent points are different among halogens, fractional estimation is possible.

Determination of divalent metal (Zn, Ca, Mg).—The aqueous solution of a sample having been added to concentrated sulfuric acid, heated and decomposed is titrated by the aqueous solution of 0.1 N disodium ethylenediaminetetraacetate in accordance with the method described in Keihei Ueno. "Method of Chelate Titration" (Nankodo, Japan) to determine the amount of divalent metal (Zn, Ca, Mg). The titration solution is adjusted to pH 10 using an ammonium chloride/ammonia buffer solution, and Eriochrome black T is used as an indicator. For example, an obstructing metal ion such as tin is masked by triethanolamine.

The relative viscosity ($\eta_r$) of the polymer is measured by the following method:

Method of measuring the relative viscosity.—In 100 cc. of 98% concentrated sulfuric acid, 1.0 g. of a sample polymer is dissolved, the viscosity of the polymer solution is measured at 25° C. using an Ostwald viscometer and compared by relative viscosity to 98% concentrattd sulfuric acid.

Hereinbelow, the present invention will be explained by examples, however, the present invention is not limited to these examples.

EXAMPLE 1

One hundred parts of commercial nylon 6 pellets (manufactured by Toray Industries, Inc., type 700, $\eta_r$=3.1) were immersed in 2000 parts of a 1.0 mol/liter aqueous solution of stannic chloride ($SnCl_4$) and the mixture was heated to 80° C. After soaking for 30 minutes, the pellets were removed, the solution remaining on the surface of these pellets was removed by a centrifuge, and they were then immersed in a quantity of a 10% by weight aqueous solution of sodium carbonate equivalent to 30 times the weight of the pellets. The submerged pellets were heated at 90° C. for 60 minutes to thereby convert any $SnCl_4$ absorbed in the pellets to stannic hydroxide ($Sn(OH)_4$).

These modified nylon 6 pellets were then treated again with a solution of stannic chloride and a solution of sodium carbonate under the same conditions.

The ratio of weight increase of these pellets was 12.9% by weight, and as a result of analyzing for tin, it was found that tin content was 8.1% by weight. As a result of calculation from this analyzed value, it was found that all of the absorbed tin compound was converted to stannic hydroxide.

A part of these modified nylon pellets having absorbing stannic hydroxide therein was dried at 110° C. for 20 hours, and thereafter, these pellets were melt spun at 265° C. using an extruder type spinning machine and wound up at a speed of 900 m./min. The obtained undrawn filament yarn was drawn 4.2 times the original length using a draw twister to obtain 110 denier/10 filaments modified nylon filament yarn.

Using a circular knitting machine (Fiber Analysis Knitter, manufactured by Lawson-Hemphill Inc., this filament yarn was knitted into tubular knitted fabric (No. 3). The aforesaid unmodified nylon 6 pellets not containing stannic hydroxide were subjected similarly to melt spinning, drawing and knitting by the same methods under the same conditions to prepare a tubular knitted fabric (No. 8).

Another portion of said modified nylon 6 pellets containing stannic hydroxide and a portion of unmodified nylon 6 pellets not containing stannic hydroxide were dried at 110° C. for 20 hours. To 100 parts of each of these portions, 10 parts of dried anhydrous magnesium bromide ($MgBr_2$) was added, and the entirety was mixed at room temperature. This mixture was melt blended using an extruder and pelletized. These modified nylon pellets containing halides were subjected to melt spinning, drawing and knitting by the same methods and under the same conditions mentioned above to prepare tubular knitted fabrics (Nos. 1, 2, 4, 5).

Also a modified polyamide having blended concurrently therewith an organic halide and zinc oxide or antimony trioxide was prepared as follows. 100 parts of unmodified nylon pellets, and 10 parts each of tribromoaniline and zinc oxide or antimony trioxide were melt blended by methods and under conditions the same as those in the first case above. The resulting blend was pelletized and the resultant pellets were subjected to melt spinning, drawing and knitting to prepare tubular knitted fabrics (Nos. 6, 7).

These various modified and unmodified nylon 6 knitted fabrics were measured for their oxygen indices (O.I.), burning rates and smoking indices, and the results are shown in Table 1.

As will be apparent from Table 1, in cases of merely blending a halide with the polyamide (Nos. 4, 5) which is a conventional method, it is true that the O.I. was slightly higher than that of the unmodified sample (No. 8), however, the burning rate was remarkably large and the smoke emission was also large (i.e. the smoking index was small), and the flame retardancy was poor. Further, in the case of concurrent blending of ZnO or $Sb_2O_3$ with a halide (Nos. 6, 7), the O.I. improved, however, the burning rate was still high and the smoke emission was large, and these fabrics failed to exhibit preferable flame retardancy. In case of merely blending stannic hydroxide (No. 3), the burning rate was low, the smoke emission was very small and desirable properties were observed, however, the O.I. was low and the flame retardancy was insufficient.

However, when stannic hydroxide and a halide were concurrently blended (Nos. 1, 2), despite the fact that a halide was blended, the burning rate was low, the smoke emission was small, (smoking index was large), and in addition the O.I. was high, thus exhibiting excellent flame retardancy. In addition, stannic hydroxide blended by the method of the present invention did not obstruct the spinnability of the modified polyamide at all and no undesirable phenomenon such as coloration was observed.

TABLE 1

| Number | Sample | Tin compound | Halide | Content (wt. percent of—) Tin | Halogen | Spinnability | Oxygen Index (O.I.) | Burning rate (mg./sec.) | Smoking index |
|---|---|---|---|---|---|---|---|---|---|
| 1 | This invention | $Sn(OH)_4$ | $MgBr_2$ | 8.1 | 7.9 | Very good | 30.0 | 4.0 | 4 |
| 2 | do | $Sn(OH)_4$ | Tribromoaniline | 8.1 | 6.6 | Good | 27.0 | 4.2 | 3 |
| 3 | Comparative example | $Sn(OH)_4$ | | 8.1 | 0 | do | 21.5 | 4.5 | 4 |
| 4 | do | | $MgBr_2$ | 0 | 7.9 | Very good | 22.5 | 4.7 | 3 |
| 5 | do | | Tribromoaniline | 0 | 6.6 | Good | 21.5 | 10.1 | 1 |
| 6 | do | (ZnO) | do | 0 | 6.6 | Less than fair | 22.0 | 5.5 | 2 |
| 7 | do | ($Sb_2O_3$) | do | 0 | 6.6 | Poor | 22.5 | 12.5 | 2 |
| 8 | Unmodified | | | 0 | 0 | Very good | 21.0 | 2.5 | 4 |

EXAMPLE 2

To separate portions of a 1.0 mol/liter aqueous solution of sodium stannate ($Na_2SnO_3$) was added respectively the same volume 1.0 mol/liter aqueous solutions of zinc chloride ($ZnCl_2$), calcium chloride ($CaCl_2$) and magnesium chloride ($MgCl_2$). The combined mixtures were each stirred at room temperature (28° C.) for 30 minutes, and thereafter, the respectively produced precipitates were filtered and dried at 110° C. for 10 hours. These precipitates were analyzed for tin, zinc, calcium and magnesium and as a result it was found that zinc stannate ($ZnSnO_3$), calcium stannate ($CaSnO_3$) and magnesium stannate ($MgSnO_3$) were obtained as precipitates respectively. Ten parts each of the so synthesized metal stannates and sodium stannate were added to separate batches, each constituting 100 parts of a 90% by weight aqueous solution of ε-caprolactam. The mixtures were stirred for 30 minutes while being heated to 60° C., and thereafter, in accordance with a conventional method of polymerizing nylon 6, the stirred mixtures were heated at 260° C. under atmospheric pressure for 19 hours and continuously heated at 260° C. under a reduced pressure of 300 mm. Hg to effect polymerization of the caprolactam. After the polymerization was completed, the obtained molten polymers were melt spun into water and cut into pellets each having a diameter of 3 mm. and a length of 3 mm. The pellets were immersed in hot water (98° C.) in an amount of 100 times the weight of the pellets, the unpolymerized monomer and oligomer were extracted and thereafter the polyamide was dried at 100° C. under a reduced pressure of 5 mm. Hg for 20 hours to obtain modified poly-ε-caprolactam (nylon 6). The relative viscosity of the modified nylon 6 blended with zinc stannate, calcium stannate and magnesium stannate were 2.3, 2.1 and 2.0, respectively, however, in the case where sodium stannate was blended, the obtained polymer colored markedly and melt spinning could not substantially be carried out.

To 100 parts each of these modified nylon 6 pellets and the modified nylon 6 pellets blended with stannic hydroxide (No. 3) prepared in Example 1, 10 parts of tribromoaniline were added, the mixtures were subjected to melt spinning, drawing and knitting using an extruder type spinning machine by the same methods and under the same conditions as in Example 1 to obtain tubular knitted fabrics.

On the other hand, to 100 parts each of unmodified nylon 6, 10 parts of tribromoaniline and 10 parts of commercial stannic oxide (SnO), and in the alternative commercial powdered tin was added and using an extruder type spinning machine, melt spinning of the mixtures was attempted by a method the same as above. In the case of the former in which stannic oxide was blended, a fiber was obtained although elevation of the spinning pressure was observed due to marked blocking of the fiber, however, the obtained fiber was extremely colored (black) and could not be used practically. In the case of blending metallic tin, formation of a fiber was impossible due to blocking of the fiber and yarn breakage. The color of the blended polymer was black and the polymer was unsuitable as fiber.

These fabrics obtained by the method of the present invention were measured for their flame retardancy as in Example 1. Each of these modified fabrics blended with these oxy-tin compounds and halides found by the present inventors had high O.I., low burning rate and low smoke emission (large smoking index), thereby showing good flame retardance.

measured, it was 11.0% by weight.

This modified nylon 66 fabric containing $Sn(OH)_4$ was divided into 8 parts, 7 of which were treated with a solution containing a different halide to obtain 7 modified nylon 66 fabrics having absorbed halides therein.

One part was immersed in a 20% by weight benzene solution of hexabromobenzene ($C_6Br_6$) at 50° C. for 30 minutes and thereafter the fabric was squeezed by a mangle. This fabric contained 82% by weight of the solution and after drying at 60° C. for 20 hours, 16% by weight of hexabromobenzene adhered to the fabric. The other six fabrics were immersed in 1.0 mol/liter aqueous solutions of zinc chloride, zinc bromide, calcium chloride, calcium bromide, magnesium chloride and magnesium bromide, respectively at 50° C. for 60 minutes, removed from the solutions by use of a centrifuge and thereafter dried to obtain 6 modified fabrics containing the amounts of metal halides shown in Table 3.

These modified and unmodified nylon 66 knitted fabrics were measured for their flame retardance as in Example 1, giving the oxygen indices, burning rates and smoking indices shown in Table 3.

As will be understood from Table 3, modified nylon 66 fabrics containing both stannic hydroxide and the organic halides or the divalent metal halides exhibited high flame retardancy. When fabrics containing metal bromides and stannic hydroxide, and fabrics containing metal chlorides and stannic hydroxide were compared with each other, the former had somewhat better flame retardancy. Likewise, the samples containing the metal halides exhibited better flame retardancy than that of the sample containing the organic halide.

TABLE 3

| Number | Oxy-tin compound | Halide | Content (wt. percent) of— Tin | Content (wt. percent) of— Halogen | Oxygen index (O.I.) | Burning rate (mg./sec.) | Smoking index |
|---|---|---|---|---|---|---|---|
| 12 | (Unmodified) | | | | 21.0 | 2.4 | 3 |
| 13 | $Sn(OH)_4$ | Hexabromobenzene | 11.0 | 14.0 | 32.0 | 5.1 | 4 |
| 14 | $Sn(OH)_4$ | $ZnCl_2$ | 11.0 | 6.1 | 25.0 | 4.2 | 4 |
| 15 | $Sn(OH)_4$ | $ZnBr_2$ | 11.0 | 10.7 | 31.0 | 4.1 | 4 |
| 16 | $Sn(OH)_4$ | $CaCl_2$ | 11.0 | 4.3 | 24.5 | 4.0 | 4 |
| 17 | $Sn(OH)_4$ | $CaBr_2$ | 11.0 | 9.0 | 29.0 | 3.9 | 4 |
| 18 | $Sn(OH)_4$ | $MgCl_2$ | 11.0 | 4.5 | 24.5 | 4.1 | 4 |
| 19 | $Sn(OH)_4$ | $MgBr_2$ | 11.0 | 8.5 | 29.0 | 4.2 | 4 |

EXAMPLE 4

Using a circular knitting machine, commercial nylon 6 filament yarn (manufactured by Toray Industries, Inc., 110 denier, 10 filaments, type 200) together with 10% by weight of glass fiber (manufactured by Nittobo Co., ECD 900 1/0 1Z) was knitted into tubular knitted fabric. After washing the fabric by boiling water, it was immersed in 0.4 ml/liter and 0.6 mol/liter aqueous solutions of hexabromoammanium stannate ($(NH_4)_2SnBr_6$) and

TABLE 2

| Number | Oxy-tin compound | Halide | Content (wt. percent) of— Tin | Content (wt. percent) of— Halogen | Oxygen index (O.I.) | Burning rate (mg./sec.) | Smoking index |
|---|---|---|---|---|---|---|---|
| 8 | (Unmodified) | | | | 21.0 | 2.5 | 4 |
| 9 | $ZnSnO_3$ | Tribromoaniline | 5.0 | 6.6 | 27.0 | 3.9 | 3 |
| 10 | $CaSnO_3$ | do | 6.1 | 6.6 | 26.5 | 4.0 | 3 |
| 11 | $MgSnO_3$ | do | 5.5 | 6.6 | 26.5 | 3.8 | 3 |
| 12 | $Sn(OH)_4$ | do | 8.1 | 6.6 | 27.0 | 4.1 | 3 |

EXAMPLE 3

Using the circular knitting machine as in Example 1, commercial nylon 66 filament yarn (manufactured by Toray Industries, Inc., under the trademark "Promilan," 70 denier, 24 filaments, type 1200) was knitted into tubular knitted fabric. Ten parts of this fabric was immersed in 500 parts of a 1.0 mol/liter aqueous solution of stannic chloride ($SnCl_4$) and treated at 60° C. for 90 minutes. Next, said fabric with adsorbed stannic chloride was immersed in boiling water for 30 minutes to thereby convert the stannic chloride to stannic hydroxide. When the tin content in the thus modified fabric was treated at 50° C. for 60 minutes. Next, the resultant fabrics were treated in excess water for 30 minutes to convert a part of the absorbed $(NH_4)_2SnBr_6$ to stannic hydroxide.

The weight increases of the modified fabrics prior to the reaction with water were 14.1% by weight and 37.2% by weight, respectively, and as a result of analyzing for tin and bromine, there was found in the former, SN=2.5% by weight and Br=7.0% by weight, and in the latter, Sn=7.4% by weight and Br=26% by weight and formation of stannic hydroxide was not observed. When the fabrics were analyzed after they were treated with water, the amounts of tin and bromine exhibited values shown in Table 4, and it was understood that 80% and 77% respectively of hexabromoammonium stannate was modified to stannic hydroxide.

The fabric treated under conditions the same as mentioned above (concentration 0.6 mol/liter) to thereby absorb a tin compound was treated with a 10% by weight aqueous solution of sodium carbonate for 10 minutes and alternatively 60 minutes instead of being washed with water. A part of said fabric was washed with methyl alcohol without containing water at 30° C. for 5 minutes. Analysis of tin and bromine was carried out to obtain results as shown in Table 4. When the fabric was vigorously washed with the aqueous solution of sodium carbonate, a greater part of the absorbed tin compound was converted to stannic hydroxide and a very small amount of bromine remained. On the other hand, when the fabric was washed with methyl alcohol without containing water, the formation of stannic hydroxide was not recognized.

These modified fabrics were measured for their oxygen indices by a method the same as in Example 1, which is shown in Table 4.

Non-treated nylon 6 fabric had an O.I. of 20, failing to have satisfactory self-fire extinguishing properties.

Even when a sample having adsorbed a tin compound containing bromine, even though it was not treated with water and did not contain stannic hydroxide No. 24), there was exhibited fair flame retardancy as compared with fabric subjected to a conventional flame retardant, however, a high O.I. was not obtained for a high bromine content and an amount of smoke emitted at the time of combustion was large as well.

Whereas, as in the flame retardant treatment of the present invention, when fabric absorbing a tin compound containing bromine was treated with water, despite the fact that the bromine content lowered, very high flame retardancy was obtained Nos. 21, 22, 23).

When conditions for the reaction with water were optimized, stannic hydroxide was formed in a large amount, however, the lowering of the bromine content was great and therefore the flame retardancy lowered slightly. However, in accordance with the process of the present invention, as compared with a conventional flame retardant treatment, with a very small amount bromine content, it is possible to obtain the same or higher flame retardancy. However, as will be seen in No. 24, when the sample was washed with alkali for a long time, the bromine content markedly lowered, becoming less than 1% by weight, and therefore good flame retardancy could not be obtained.

EXAMPLE 5

To commercial nylon 6 pellets (manufactured by Toray Industries, Inc., CM 1001), 1, 5, 10, 20 and 30% magnesium stannate ($MgSnO_3$) as synthesized in Example 2 were added, respectively. The mixtures were well stirred at room temperature of 30° C., and thereafter, melt blended at 265° C. and pelletized using an extruder.

Next, to these modified nylon 6 pellets, 1, 5, 10, 20 and 30% of tribromoaniline used in Example 1 were added, respectively as shown in Table 5 and the resultant mixtures were similarly melt blended and pelletized as mentioned above.

Such mixtures in which the total amount of magnesium stannate and tribromoaniline exceeded 30% base on nylon 6 could not be pelletized.

These modified nylon 6 pellets were subjected to melt spinning and drawing by methods and under conditions the same as those in Example 1 to obtain 180 denier/10 filaments filament yarns. These filaments were knitted into tubular knitted fabrics as in Example 1 and their flame retardancy values were measured and are shown in Table 5.

In the case where either the tin content as an oxy tin compound or the bromine content failed to reach 1.0% by weight, the O.I. was almost undistinguishable from that of unmodified fabric and such samples failed to have self-fire extinguishing properties (Nos. 26, 29). However, in the case where tin was blended in an amount exceeding 15% by weight and bromine was blended in an amount exceeding 20% by weight, melt spinning was impossible in both cases. Moreover, in the case where the total of the tin content and the bromine content exceeded 30% by weight, also melt spinning was impossible.

When tin and bromine were within the appropriate ranges found by the present inventors, namely, within the range of 1–15% by weight in case of tin and within the range of 1–20% by weight in case of bromine, fiber formation was possible and the flame retardancy was high.

TABLE 5

| Number | $MgSnO_3$ (wt. percent) | Tribromoaniline (wt. percent) | Content (wt. percent) of— | | Spinnability | Oxygen index (O.I.) |
|---|---|---|---|---|---|---|
| | | | Tin | Bromine | | |
| 26 | 1.0 | 1.0 | 0.7 | 0.7 | Good | 20.5 |
| 27 | 1.0 | 20.0 | 0.6 | 15.0 | Less than fair | 23.0 |
| 28 | 1.0 | 30.0 | 0.6 | 22.1 | Unspinnable | |
| 29 | 5.0 | 1.0 | 3.1 | 0.7 | Good | 21.0 |
| 30 | 5.0 | 10.0 | 3.1 | 7.1 | do | 23.5 |
| 31 | 5.0 | 20.0 | 3.1 | 15.0 | Less than fair | 25.0 |
| 32 | 10.0 | 5.0 | 6.3 | 3.6 | do | 23.0 |
| 33 | 10.0 | 10.0 | 6.3 | 7.1 | do | 25.0 |
| 34 | 20.0 | 5.0 | 12.5 | 3.6 | Poor | 21.0 |
| 35 | 30.0 | 5.0 | 18.8 | 3.6 | Unspinnable | 24.5 |

EXAMPLE 6

Unmodified nylon pellets as in Example 1 were immersed in a 1.0 mol/liter aqueous solution of $SnCl_4$ and heated to 80° C. After 10, 60 and 180 minutes, respectively said pellets were taken out and the excess solution removed by a centrifuge. 3 portions of these pellets were immersed in a 10% aqueous solution of $Na_2CO_3$ at 90° C. for 2 hours to prepare 3 portions of nylon 6 pellets having absorbed therein about 1, 5 and 10% by weight of stannic hydroxide (containing 70% by weight of tin)

TABLE 4

| Number | Flame retardant method | Tin compound | After-treatment | Content (wt. percent) of— | | Oxygen index (O.I.) |
|---|---|---|---|---|---|---|
| | | | | Bromine | Tin | |
| 20 | Untreated | | | | | 20.0 |
| 21 | Method of this invention | Hexabromoammonium stannate (0.4 mol/liter) | Treatment with water | 2.0 | 2.0 | 22.0 |
| 22 | do | Hexabromoammonium stannate (0.6 mol/liter) | do | 6.5 | 7.5 | 29.0 |
| 23 | do | do | Treatment with aqueous solution of sodium carbonate (10 min.) | 2.0 | 8.0 | 24.0 |
| 24 | Comparative example | do | Treatment with aqueous solution of sodium carbonate (60 min.) | 0.4 | 8.2 | 21.0 |
| 25 | do | do | Washing with methanol | 15.5 | 6.5 | 23.5 | respectively, based on nylon 6. With these modified pellets, zinc oxide (containing 81% of zinc) and bis(2,4,6-tribromophenyl) succinoamide (containing 65% by weight of bromine) in the amounts shown in Table 6 were blended and the blends were formed into fibers as in Example 1 to prepare 10 denier/10 filaments filament yarns. The obtained filament yarns were knitted into tubular knitted fabrics by similar methods as in Example 1 and these fabrics were measured for their O.I. and combustion behaviors by the heat-burning method and the results are shown in Table 6.

As is apparent from Table 6, in case the oxy-tin compound, zinc compound and organic halogen compound were blended in amounts less than 1.0, 1.0 and 1.0% by weight respectively as prescribed by the present invention, very little increase of the O.I. was recognized (No. 36), and in the case where either tin or halogen failed to reach the prescribed amounts according to the present invention, a high O.I. could not be obtained.

In the case where zinc was added in an amount of not less than 1.0% by weight in addition to tin and halogen, increased formation of carbonized film and increase of carbon residue were noticeably observed, coupled with the lowering of smoke emission, and high flame retardancy.

6 knitted fabric obtained by the prior art were measured for their O.I. and the results shown in Table 7 were obtained. Further, a portion of each of these knitted fabrics was cut and the carbon residue measured by a heating-burning method, and the results are shown in Table 7.

TABLE 7

| Number | Tin compound | Halide | Zinc compound | Content (wt. percent) of— | | | O.I. | Carbon residue (wt. percent) |
|---|---|---|---|---|---|---|---|---|
| | | | | Sn | Br | Zn | | |
| 45 | Magnesium stannate | Tetrabromodiphenyl amine | | 6.2 | 6.6 | 0 | 25.1 | 10.1 |
| 46 | do | do | ZnO | 6.2 | 6.6 | 6.2 | 26.0 | 65.2 |
| 47 | do | do | Zn(OH)$_2$ | 6.2 | 6.6 | 5.9 | 26.0 | 66.1 |
| 48 | do | do | ZnCl$_3$ | 6.2 | 6.6 | 5.5 | 26.0 | 67.0 |

From Table 7, it is apparent that when the zinc contents were about the same, there were high carbon residues.

When an amount exceeding 15% as zinc content (about 20% as a compound) was blended with the aforesaid pellets and an attempt to melt spin said pellets was made, the blend could not be melt spun.

EXAMPLE 8

Commercial nylon 6 filament yarn (manufactured by Toray Industries, Inc., 70 denier, 24 filaments, type 200) was knitted into tubular knitted fabric as in Example 1. This fabric was immersed in a 1.0 mol/liter aqueous solution of stannic chloride (SnCl$_4$) at 60° C. for 90 minutes, excess solution removed and the fabric was treated in boiling water at 100° C. for 60 minutes to thereby convert the absorbed SnCl$_4$ to stannic hydroxide (Sn(OH)$_4$). The tin (Sn) content in said fabric was 10.9% by weight and chlorine was not detected. This fabric was immersed in 1.0 mol/liter aqueous solutions of zinc bromide

TABLE 6

| No. | Stannic hydroxide (wt. percent) | | Zinc oxide (wt. percent) | | Bis-tribromophenyl succino amide (wt. percent) | | Total amount of blended flame retardant agents | Flame retardancy | | |
|---|---|---|---|---|---|---|---|---|---|---|
| | Blending amount | Sn | Blending amount | Zn | Blending amount | Br | | O.I. | Carbon residue (percent) | Smoking index |
| 36 | 1.0 | 0.7 | 1.0 | 0.8 | 2.2 | 1.4 | 4 | 21 | 4.0 | 4 |
| 37 | 0.9 | 0.6 | 1.0 | 0.8 | 11 | 7.2 | 12 | 22 | 4.2 | 1 |
| 38 | 1.0 | 0.7 | 1.0 | 0.8 | 20 | 18.0 | 22 | 28 | 5.1 | 1 |
| 39 | 5.0 | 8.5 | 1.0 | 0.8 | 19 | 12.0 | 25 | 25 | 8.2 | 2 |
| 40 | 5.0 | 8.5 | 5.0 | 4.1 | 5.0 | 8.8 | 15 | 20 | 40.0 | 4 |
| 41 | 5.0 | 8.5 | 5.0 | 4.1 | 10 | 6.5 | 20 | 28 | 50.1 | 3 |
| 42 | 5.0 | 8.5 | 5.0 | 4.1 | 20 | 18.0 | 30 | 32 | 58.0 | 3 |
| 43 | 9.8 | 6.9 | 4.9 | 4.0 | 12 | 7.8 | 27 | 31 | 54.0 | 4 |
| 44 | 0 | | 0 | | 0 | 0 | 0 | 21 | 8.8 | 4 |

EXAMPLE 7

Commercially available poly-ε-caprolactam pellets were blended with magnesium stannate (MgSnO$_3$·3H$_2$O, molecular weight 191, tin content 62% by weight) as synthesized in Example 1, and commercially available tetrabromodiphenyl amine (Cl$_{12}$H$_7$Br$_4$N, molecular weight 485, bromine content 66% by weight), in the amounts shown in Table 7, respectively. Concurrently, in addition, commercially available zinc oxide, zinc hydroxide and zinc carbonate were blended therewith as a zinc compound as shown in Table 7.

All of these pellets were well mixed at room temperature, and thereafter, they were well mixed at 275° C. using an extruder in accordance with conventional practice and then pelletized.

After these obtained pellets were respectively well dried, using the extruder again, they were melt spun conventionally and immediately thereafter the spun filaments drawn to obtain 180 denier/10 filaments filament yarns.

These modified nylon 6 filament yarns and unmodified nylon 6 filament yarn similarly spun with no flame retardant agents blended in advance were knitted into tubular knitted fabrics using a circular knitting machine.

These modified nylon 6 knitted fabrics obtained by the technique of the present invention and modified nylon (ZnBr$_2$) and zinc chloride (ZnCl$_2$), heated at 80° C. for 120 minutes to adsorb these halogen compounds and thereafter washed with water to remove the treating solution and dried. The analyzed values of the adsorbed halogens and zinc were shown in Table 8. The flame retardancy of the obtained fabrics were measured as in Examples 1–7, and the results are shown in Table 8.

By the reciprocal action of zinc, tin and halogen, the sample exhibited high O.I., a large amount of carbon residue and a small amount of smoke emission, thereby showing excellent flame retardance.

Moreover, these fabrics did not degrade when they were stored for a long period of time, nor did the modifier bleed out.

TABLE 8

| Number | Zinc compound | Content (wt. percent) of— | | | Oxygen index (O.I.) | Carbon residue (wt. percent) |
|---|---|---|---|---|---|---|
| | | Sn | Br | Zn | | |
| 49 | | 10.8 | 0 | 0 | 22.0 | 6.5 |
| 50 | ZnBr$_2$ | 10.8 | 9.5 | 4.6 | 30.0 | 67.0 |
| 51 | ZnCl$_2$ | 10.8 | 4.2 | 3.9 | 26.5 | 68.5 |
| 52 | | 0 | 0 | 0 | 21.0 | 2.9 |

EXAMPLE 9

A commercially available nylon 6 tufted carpet was immersed in a 0.6 mol/liter aqueous solution of SnCl$_4$ at a bath ratio of 1:30, treated at 60° C. for 30 minutes, and thereafter washed with a great excess of boiling water for 30 minutes. When the treated carpet was analyzed, chlorine was not detected and all of the stannic chloride had become stannic hydroxide. Then this treated carpet was immersed in an equimolar mixture (total concentration 1.0 mol/liter) of zinc bromide and magnesium bromide and similarly treated at 60° C. for 30 minutes and thereafter washed with water and dried.

On the other hand, for the purpose of comparison, the carpet was similarly treated with stannic bromide only (concentration 0.6 mol/liter), and thereafter, treated with an alkali of a 10% by weight aqueous solution of sodium carbonate and thereafter washed with water. In this carpet, less than 1% by weight of bromine was contained. All of these carpet samples were subjected to combustion test by an inclined camphor method and the results are shown in Table 9.

TABLE 9

| Treating method | | Content (wt. percent) of— | | Carpet combustion test | | | Damage of the sample |
|---|---|---|---|---|---|---|---|
| | | Br | Sn | Combustion length (cm.) | Combustion width (cm.) | Combustion area (cm.²) | |
| This invention | 2-stage treatment with metal halides and a tin compound. | 9.8 | 7.2 | 6.2 | 1.9 | 10 | None. |
| Comparative example. | Single treatment with a tin compound (0.6 mol/liter). | 0.8 | 7.0 | 10.2 | 4.1 | 35 | Do. |
| Non-treated | | 0 | 0 | Reached the upper end. | Reached both ends | Burnt completely. | |

As would be apparent from Table 9, the single treatment with a tin compound brought some effect. However, because the blended amount of bromine became very small due to vigorous treatment with alkali, the obtained flame retardancy was inadequate.

However, according to the process of the present invention, where bromine and tin were concurrently introduced in high concentrations, the flame retardancy was high and in addition the sample was almost undamaged.

The following is claimed:

1. A flame retardant polyamide composition which comprises
   (a) a polyamide having amide groups as repeating units in the polymer chain,
   (b) an effective amount of a combination of at least two flame retardant agents introduced to said polyamide, one of said flame retardant agents being an oxy-tin compound selected from the class consisting of stannic hydroxide and a divalent metal salt of stannic acid, and the other flame retardant agent being a flame retardant halogen compound.

2. The flame retardant polyamide composition according to claim 1 wherein said polyamide has additionally introduced thereto an effective amount of zinc compound selected from the class consisting of zinc oxide, zinc hydroxide and zinc carbonate.

3. The flame retardant polyamide composition according to claim 1 wherein said composition is in the form of a shaped fiber.

4. The flame retardant polyamide composition according to claim 1 wherein said composition is in the form of a textile fabric.

5. The flame retardant polyamide composition according to claim 1 wherein
   (a) the amount of said oxy-tin compound is within the range of from about 1.0–15 percent by weight calculated as tin based on said polyamide, and
   (b) the amount of said halogen compound is within the range of from about 1.0–20 percent by weight calculated as halogen based on said polyamide.

6. The flame retardant polyamide composition according to claim 2, wherein the amount of said zinc compound is within the range of from about 1.0–15 percent by weight calculated as zinc based on said polyamide.

7. A flame retardant polyamide composition which comprises
   (a) a polyamide having amide groups as repeating units in the polymer main chain,
   (b) an effective amount of a combination of at least two flame retardant agents absorbed in said polyamide, one of said flame retardant agents being stannic hydroxide and another flame retardant agent being a divalent metal halide selected from the group consisting of zinc bromide, zinc chloride, magnesium bromide, magnesium chloride, calcium bromide and calcium chloride.

8. The flame retardant polyamide composition according to claim 1 wherein said polyamide is poly-ε-caprolactam.

9. The flame retardant polyamide composition according to claim 1 wherein said polyamide is polyhexamethylene adipamide.

10. The flame retardant composition according to claim 2 wherein the molar ratio of said zinc compound to said halogen compound is within the range of from 1:1 to 1:3.

11. A process for the preparation of a flame retardant polyamide composition which comprises the steps of
   (a) immersing a polyamide having amide groups as repeating units in the polymer main chain in a solution of a halogenated tin compound,
   (b) reacting said halogenated tin compound in situ by hydrolysis thereby effecting conversion of said tin compound to stannic hydroxide and absorption of said stannic hydroxide on said polyamide, and
   (c) immersing said polyamide in a solution of a divalent metal halide, whereby halide is absorbed in said polyamide.

12. The process according to claim 11, wherein said halogenated tin compound is selected from the class consisting of stannous chloride, stannic chloride, stannous bromide, stannic bromide, stannous fluoride, stannic fluoride, stannous iodide, stannic iodide, potassium hexachlorostannate, ammonium hexachlorostannate, ammonium hexabromostannate and sodium hexabromostannate.

13. The process according to claim 11, wherein said divalent metal halide is selected from the group consisting of zinc chloride, zinc bromide, magnesium chloride, magnesium bromide, calcium chloride and calcium bromide.

14. The process according to claim 11, wherein said polyamide is in the form of pellets, wherein said pellets are melt spun into fiber after step (b) and before step (c).

15. A process for the preparation of a shaped flame retardant polyamide product which comprises the steps of
   (a) immersing a polyamide having amide groups as repeating units in the polymer chain in a solution of a halogenated tin compound,
   (b) reacting said halogenated tin compound in situ by hydrolysis thereby effecting conversion of said tin compound to stannic hydroxide and absorption of said stannic hydroxide on said polyamide,
   (c) melt spinning the polyamide produced in step (b) whereby the absorbed stannic hydroxide is intimately blended throughout the body of the resultant shaped product, and (d) immersing said melt spun polyamide produced in step (c) in a solution of a divalent metal halide, whereby the halide is absorbed in said polyamide intimately throughout the body of the melt spun polyamide.

16. A flame retardant shaped polyamide composition which comprises
   (a) a shaped polyamide having amide groups as repeating units in the polymer chain, and
   (b) having an effective amount of a combination of at least two flame retardant agents introduced to said polyamide and intimately blended throughout the body of said shaped polyamide, one of said flame retardant agents being an oxy-tin compound selected from the class consisting of stannic hydroxide and a divalent metal salt of stannic acid, and the other flame retardant agent being a flame retardant halogen compound.

References Cited

UNITED STATES PATENTS

| | | | |
|---|---|---|---|
| 3,751,394 | 8/1973 | Hermann | 260—37 N |
| 3,723,383 | 4/1973 | Cyba | 260—41 B |
| 3,067,168 | 12/1962 | Pardon | 260—45.75 |
| 3,382,209 | 4/1968 | Deichert | 260—45.75 |
| 3,418,267 | 12/1968 | Busse | 260—33.8 |
| 3,247,167 | 4/1966 | Jason | 260—78 |
| 3,109,575 | 6/1965 | Horn | 260—45.75 |

OTHER REFERENCES

Treatise on Inorganic and Theoretical Chemistry, Mellar, 1927, pp. 386-390, 394-397.

ALLAN LIEBERMAN, Primary Examiner

R. ZAITLEN, Assistant Examiner

U.S. Cl. X.R.

106—15 FP; 260—37 NP, 45.75 K